United States Patent
Davies et al.

(10) Patent No.: US 8,350,069 B2
(45) Date of Patent: Jan. 8, 2013

(54) BIODIESEL SYNTHESIS

(75) Inventors: Owen Matthew Davies, Milton Keynes (GB); Richard David Jackson, Herdfordshire (GB)

(73) Assignee: Renewable Holdings Limited (GB)

( * ) Notice: Subject to any disclaimer, the term of this patent is extended or adjusted under 35 U.S.C. 154(b) by 489 days.

(21) Appl. No.: 12/446,340

(22) PCT Filed: Oct. 19, 2007

(86) PCT No.: PCT/GB2007/004010
§ 371 (c)(1),
(2), (4) Date: Sep. 9, 2009

(87) PCT Pub. No.: WO2008/047142
PCT Pub. Date: Apr. 24, 2008

(65) Prior Publication Data
US 2010/0293840 A1    Nov. 25, 2010

(30) Foreign Application Priority Data
Oct. 20, 2006 (GB) .................................. 0620925.8

(51) Int. Cl.
C07C 67/00 (2006.01)
C11C 3/00 (2006.01)
B01J 19/00 (2006.01)

(52) U.S. Cl. ........ 554/124; 554/169; 554/167; 422/224; 422/225; 422/231; 422/238; 422/237; 422/139; 422/140; 422/215

(58) Field of Classification Search .................. None
See application file for complete search history.

(56) References Cited

U.S. PATENT DOCUMENTS

| | | | |
|---|---|---|---|
| 5,409,672 A | * | 4/1995 | Cetinkaya .................. 422/606 |
| 5,514,820 A | | 5/1996 | Assmann et al. |
| 6,440,057 B1 | | 8/2002 | Ergün et al. |

(Continued)

FOREIGN PATENT DOCUMENTS

DE    102 26 543    12/2003

(Continued)

OTHER PUBLICATIONS

EP 0041204, Demmering, G. et al., Process for the continuous production of fatty acid monoglycerides, 1981, English translation, 6 pages.*
DE 10226543, Dimmig, T., Procedure fothe continuous produciton of low alkyl esters, 2003, English translation, 5 pages.*

(Continued)

*Primary Examiner* — Yate K Cutliff
(74) *Attorney, Agent, or Firm* — Fay Sharpe LLP

(57) ABSTRACT

The present invention provides a method and apparatus for reacting a natural oil with a short chain alcohol in the presence of alkaline catalyst, in which a mixture of natural oil, short chain alcohol and alkaline catalyst is fed in one direction along a pipe reactor under transitional or turbulent conditions, so that the reactants are mixed in a direction normal to the flow direction to a greater degree than in a direction parallel to the flow direction or so that the reactants are mixed in a direction normal to the flow direction, such that the time taken for 90% of the elements of fluid to pass through the reactor is within 20% of the mean residence time of reactant in the reactor. There is also provided a ship, comprising means for storing a raw material used in the synthesis of biodiesel, a plant for the synthesis of biodiesel and means for storing the biodiesel synthesized.

41 Claims, 2 Drawing Sheets

U.S. PATENT DOCUMENTS

| | | | |
|---|---|---|---|
| 6,979,426 B2 * | 12/2005 | Teall et al. | 422/237 |
| 7,137,200 B2 | 11/2006 | Shepherd et al. | |
| 2007/0260079 A1 | 11/2007 | Fleisher | |

FOREIGN PATENT DOCUMENTS

| | | |
|---|---|---|
| EP | 0 041 204 | 11/1984 |
| GB | 2 250 253 | 6/1992 |
| WO | WO 2007/130346 | 11/2007 |

OTHER PUBLICATIONS

Warhaft, Z., Transitin and Turbulence, 1997, Cambridge University Press, 4 pages.*

Gerpen, J. V., et al., Biodiesel Production Technology, 2002-2004, NREL, U. S. Department of Energy, pp. 1-105 (110 pages with 4 cover pages & report page).*

International Search Report for International application No. PCT/GB2007/004010, Feb. 2008.

* cited by examiner

BIODIESEL SYNTHESIS

FIELD OF INVENTION

The present invention relates to a method and apparatus for the synthesis of biodiesel and a ship comprising apparatus for the synthesis of biodiesel.

BACKGROUND

Biodiesel is manufactured by transesterification of animal or vegetable oils/fats. Such oils and fats comprise triglyceride esters containing long chain fatty acid moieties. In biodiesel synthesis, such triglycerides are transesterified with short chain alcohols, typically methanol and sometimes ethanol though other alcohols have been used. The reaction can be carried out in the presence of an acidic or basic catalyst and in general the basic catalysts are faster, with sodium hydroxide or potassium hydroxide being the most common. Typically, sodium hydroxide or potassium hydroxide with relatively low water level (particularly in powder or pellet form) is mixed with the alcohol, for example methanol, and then mixed with the oil.

For the commercial production of biodiesel, it is desirable to reach a relatively high degree of conversion of glyceride ester into biodiesel (preferably 96.5% or above) within a reasonable time period. In the past, it has been found that the time required to reach such a high level of conversion is comparatively long.

A problem has been encountered that basic methanol and oil do not mix very well, because of their different densities and because of the coalescing nature of their respective phases.

Conventional approaches to improving the overall kinetics having included raising the temperature, and applying large degree of shear by agitation.

For example, in the past, the transesterification reaction has been carried out in batch reactors provided with stirrers. Whilst reasonable results have been obtained with such reactors, for large scale industrial processing, a continuous system is preferred, rather than a batch process.

A pipe reactor is a suitable design of continuous reactor for the manufacture of biodiesel.

Various devices have been used in pipe reactors for providing high shear, but many of these (for example jets, mechanical mixers, oscillating flow) require high-energy input levels, which are expensive to run or involve relatively sensitive equipment. In many cases, high degrees of conversion are still not reached in a practical time span.

WO99/26913 discloses a method for production of fatty acid methyl ester in which a static mixer is used which creates high or powerful turbulence. There is a substantial pressure drop across the static mixer. This requires very high pressures to operate, which is uneconomic.

SUMMARY

The present invention sets out to overcome the problems of the prior art.

The inventors have realised that the transesterification reaction itself is quite fast (that is, it has a high rate constant) and that the time required to reach the desired level of completion is limited not by the rate constant itself, nor simply by steric factors (reaction surface area of droplets) but by mass transfer factors and stoichiometric factors.

Mass transfer factors can be explained by considering a droplet of basic methanol surrounded by triglyceride at a temperature, for example around 60° C. Reaction on the surface of the droplets would take place very quickly creating a layer of methyl ester (biodiesel) and glycerine, mono and di glycerides. There would result a sea of triglycerides surrounding a methyl ester (outside layer), glycerine, mono and di glycerides (middle layer) and basic methanol droplet (central core). For the reaction to continue the methyl ester will have to diffuse into the surrounding triglycerides and the glycerine would have to be diluted continuously by the basic methanol from within the droplet's reducing core. Accordingly the reaction becomes limited by the rate of diffusion of reactants and reaction products, even though the mono and di glycerides possess surfactant nature. This limitation becomes even more evident within approximately the last quarter of the reaction, after for example 75% of the ester has been created, when the percentage of glycerine within close proximity of the concentrated basic methanol droplets excessively reduces the reaction rate, thereby making the final quarter of the reaction take longer than the previous three quarters by a significant factor. Methanol is highly soluble in glycerol. This effect has been overcome in the prior art by removing glycerine at this stage, through a separation process. As the removed glycerine holds the bulk of the original added basic methanol, a second injection and mixing process of basic methanol is required to complete the reaction, after which another glycerine removal step is required. Also, after the initial methanol injection and prior to the first stage glycerine removal, a significant proportion of mono and di glycerides are present, increasing the propensity for the methyl ester to dissolve in the glycerine and be removed. This biodiesel, if not extracted by another process, significantly reduces the overall process yield.

Accordingly, there is a problem that a two stage glycerine removal process creates significant delay, complexity and inefficiency in the process.

Elsewhere in the prior art, a single methanol injection is envisaged, which, if provided at sufficient proportions can complete the reaction to beyond 96.5% ester conversion in one step. In general, the process parameters which lead to such high levels of conversion are not explained and not widely understood. Further, some prior art processes reach the required result by using methanol in very high excess, such as one-to-one by volume, which afterwards necessitates extremely expensive methanol recovery distillation. The inventors have realised that to minimise process steps, optimise methanol usage and recovery in relation to the whole process economics and maximise catalyst efficiencies, thereby reducing the burden on down-stream catalyst removal stages, it is necessary to maintain a certain level of turbulence within the reactor for the last one quarter to one third of the reactor residence time or length (if uniform in crossectional area). This final stage mixing overcomes mass transfer problems created and exacerbated by the generation of the inherently inert glycerine and shortens the final stage of conversion to seconds rather than minutes or hours When considering stoichiometric factors, the position of the equilibrium between the glyceride ester and the short chain alcohol ester (the biodiesel) is determined by the relative quantity of oil and short chain alcohol. In a continuous reaction in a pipe reactor, different stages in the pipe reactor represent different stages in the progress of the reaction. Later stages have lower quantities of short chain alcohol and oil. The inventors have realised that if the reaction volume from a later part of the reaction is mixed by backflow with the reaction volume from an earlier part of the reaction (an upstream part of the pipe reactor), the reactants may be diluted with reaction products (glycerol and short chain alcohol ester)

which can adversely affect the position of the equilibrium and the rate at which it is achieved.

Further, if there is a high level of mixing of reactants from different stages in the process, there is a risk that some part of the reaction volume will effectively pass through the reactor before it has had time to react completely, again, adversely affecting the total degree of conversion of oil to methyl ester.

The present invention in particular sets out to provide a continuous process for the reaction of natural oil with short chain alcohol in the presence of alkaline catalyst in which a high degree of conversion can be obtained in a reasonable time.

The present invention is based on the understanding of the reaction kinetics described above which has been discovered by the inventors. In particular, the present invention set out to achieve an optimum mixing regime which enhances mass transfer of reactants without introducing the problems of back-mixing described above. It is also desired to avoid the use of excessively high pressure drops across the reactor. The inventors have realised that the degree of mixing normal to the flow direction should be greater than the degree of mixing parallel to the flow direction. Similarly, the present inventors have discovered that the time taken for elements of the fluid to pass through the reactor should be within a certain range of the residence time.

The present invention provides a method of reacting a natural oil with a short chain alcohol in the presence of alkaline catalyst, in which a mixture of natural oil, short chain alcohol and alkaline catalyst is fed in one direction along a pipe reactor under transitional or turbulent conditions, so that the reactants are mixed in a direction normal to the flow direction to a greater degree than in a direction parallel to the flow direction or so that the reactants are mixed in a direction normal to the flow direction such that the time taken for 90% of the elements of fluid to pass through the reactor is within 20% of the mean residence time of reactant in the reactor.

The present invention further provides an apparatus for carrying out the method of the invention.

The apparatus of the present invention comprises a pipe reactor, a feed of natural oil, a feed of short chain alcohol and a feed of alkaline catalyst, the feed being arranged to feed the reactants in one direction along the pipe reactor, a turbulence generator being provided so that the reactants are fed in transitional or turbulent conditions, so that reactants are mixed in a direction normal to the flow direction to a greater degree than in a direction parallel to the flow direction or so that the reactants are mixed in a direction normal to the flow direction such the time taken for 90% of the elements of fluid to pass through the reactor is within 20% of the mean residence time of reactant in the reactor.

The present inventors have further realised that, because a large amount of the raw material for biofuel generation is grown in one country and then shipped to another country, the raw material spends a large amount of time on board ship. The inventors have realised that this time can be used for converting the raw material into biodiesel.

This use of highly compact and intense biodiesel reactor systems on board ship reduces the total time required for conversion from crop to finished product as the delivery time is used to process the oil into biodiesel and the biodiesel can be then delivered directly to existing infrastructure in the importing country such as dock or port based refineries and or tank storage facilities. This allows feedstock to be imported and processed from the tropics or other regions where strong sun light is encountered so world wide feedstock can be economically and renewable accessed by the high use population within the developed and developing worlds.

Other benefits in shifting the process plant to on board the ship is that the methanol required to process the oil during the ship's travel back from collecting the oil can be collected from the refineries where the biodiesel is delivered, as it will tend to be either stored within these facilities in significant quantities or made there during other refining processes, using methane gas.

Benefits and technologies that have been developed for exploiting oil and gas reserves from regions where the quantities available do not justify the building of wharfs, piers and other extremely expensive conventional port system can also be used. These including rotationally calm buoy systems that act as offshore unloading stations whilst being permanently moored to the sea bed and connected to a suitable oil production facility on land. Such systems can be used to offload natural oil to awaiting ships for either transport to importing countries for land based processing or transport and processing on process plant onboard the ships.

This concept of utilising low cost shore access system allows significant areas of the world to be considered for cultivation for renewable feedstock plants by removing one of the main hurdles from the economic equation, being "how far from conventional transport infrastructure is the feedstock located."

Other benefits of the ship based process facility are;

biodiesel plant could be brought into port to provide capacity or increase existing capacity any where within the world at very short notice if the ship already exists.

This concept allows plant including its own primary tank farm storage to be built in low cost locations and delivered quickly to site reducing time to market and associated time constraint and regulatory and land costs.

Biodiesel processing ships could be rotationally turret moored or spread moored just off shore from the feedstock export port providing a semi permanent floating production and storage facility for virgin oil and fat storage and processing, and final biodiesel storage and off-loading to delivery ships through stern to bow or side to side tethering and offloading arrangements.

Accordingly, in a second aspect, the present invention provides a ship, comprising means for storing a raw material used in the synthesis of biodiesel, a plant for synthesising biodiesel and means for storing the biodiesel synthesised.

The present inventors have further realised that many of the areas of the world suitable for raising animals or growing crops which can be used as a source of fats and oils are not conveniently located for deep harbours suitable for berthing tankers or ships according to the second aspect of the invention. The present inventors have realised that harbourless liquid loading systems for ships, for example catenary anchor leg mooring buoys (CALM buoys) may be used to load natural oils and fats for biodiesel synthesis in such conditions.

Accordingly, in a third aspect of the invention, there is provided a system for loading biodiesel or oils and fats suitable for the synthesis of biodiesel, from land to ships, comprising land based storage containing biodiesel or natural fats and oils for the synthesis of biodiesel, and at least one pipeline leading from the storage to a floating loading point, fixed in water of depth sufficient to permit ships to dock with or lie adjacent to the floating loading point and means for feeding biodiesel, oil or fat from the pipeline at the floating loading point to a ship. Preferably the floating loading point is a CALM buoy.

Preferred and optional features of the present invention will be described further below.

Reactants

The natural oils used in the present invention may comprise fats, oils or mixtures thereof obtained from natural sources such as animal or vegetable sources Such fats and oils comprise triglyceride esters having at least one relatively long chain carboxylate moiety (for example, having from 12 to 22 carbon atoms). Such materials are very well known to the person skilled in the art.

The natural oils may have been treated by any suitable pre-treatment process, for example de-gumming, and removal or conversion of components which would interfere with the transesterification process, for example free fatty acid.

The short chain alcohol may comprise any suitable short chain alcohol, for example a C1-C4 alcohol, straight or (where appropriate) branched. Preferably, it is methanol or ethanol, most preferably methanol.

The alkaline catalyst preferably comprises potassium hydroxide or sodium hydroxide, or sodium or potassium methoxide. The alkaline catalyst may be supplied in powder or pellet form.

The relative quantities of the reactants can be at any suitable level. Preferably, the ratio by mass of short chain alcohol to natural oil is in the range 1:3 to 1:10, more preferably 1:3 to 1:6, most preferably in the range 1:4 to 1:5.

The ratio by mass of alkaline catalyst to natural oil is suitably in the range 0.001:1 to 0.02:1, preferably 0.003:1 to 0.006:1.

Preferably, the alkaline catalyst and the short chain alcohol are mixed before being mixed with the natural oil.

A pre-prepared mixture of alkaline catalyst and alcohol may be obtained, for example prepared at another site.

The feeds for the reactants may comprise any suitable feeds, for example they may comprise pumps. They may comprise storage means such as tanks. The feed for alkaline catalyst and the feed for alcohol may comprise the same feed. Preferably, the natural oil, the short chain alcohol and the alkaline catalyst are mixed upstream of the pipe reactor.

Preferably, the flow of mixed natural oil, short chain alcohol and alkaline catalyst is turbulent when it enters the pipe reactor.

Turbulence may be generated by injecting a flow of short chain alcohol, optionally with alkaline catalyst dissolved therein, into a flow of natural oil, preferably at an angle (preferably a right angle) to the direction of flow of the natural oil.

Means may be provided for heating the natural oil before it is mixed with the alkaline catalyst and short chain alcohol.

The temperature in the pipe reactor is preferably raised above ambient temperature. Preferably, it is in the range 40-130° C.

Pipe Reactor—Design and Conditions

The pipe reactor may comprise any suitable design of reactor. It should have an inflow end and an outflow end, a flow direction being defined from the inflow end to the outflow end.

The reactor may have any suitable internal configuration. Preferably, it is substantially parallel sided, though the flow cross section may vary across the length of the pipe reactor. Means may be provided for heating or cooling the pipe reactor.

The pipe reactor may have a diameter in the range 2-200 mm. Preferably the diameter is 6 mm or more, because it is easier to establish turbulent or turbulent/laminar flow. At very small reactor diameters, the flow tends to be laminar, unless very high flow velocities are used, which can require high pressure and high energy inputs.

The pipe reactor can be constructed as single length of pipe or a plurality of lengths of pipe connected together. It may have a substantially straight configuration or it may be curved. It may comprise bends or turns. A plurality of straight pipe sections connected by U-bends may be provided, to provide a compact structure. The pipe reactor may comprise a plurality of substantially straight pipe sections connected by headers. The straight line pipe sections may be contained within a single structure, for example an insulated structure or a vessel for containing heated fluid for heating the pipe reactor.

In the present invention, substantially all of the oil is converted to a short chain alcohol ester in a single pass through the pipe reactor.

Where the pipe reactor passes through a heat exchanger, it may be the same heat exchanger as is used to initially heat the oil before the oil is fed into the pipe reactor.

The total length of the pipe reactor should be sufficient to achieve the desired degree of conversion of natural oil to triglyceride. The length is suitably in the range 30 to 100 meters (alternatively spelled "metres"), preferably 40 to 100 meters depending upon the capacity range required. Preferably, the production capacity is in the range 50-200 tonnes per day.

The reactants flow through the reactor in one direction in the sense that the flow is not an oscillating flow. That is, steps are not taken to actively cause the flow to change direction. The flow direction referred to here is the bulk flow direction. In the apparatus of the invention, a pump or pumps may be provided for driving flow through the reactor, the pumps being normally operated in one direction.

The reactants are preferably fed through the reactor at a linear bulk flow speed which is greater than 0.25 m/s and preferably less than 100 m/s. The speed should be sufficient that the flow is either turbulent or at the turbulent/laminar flow transition.

The person skilled in the art would be able to determine whether the flow within the pipe reactor is laminar, turbulent or at the turbulent/laminar flow transition.

The reactants are preferably under a pressure in excess of 0.5 bar gauge, more preferably in the range 1-30 bar gauge. Pressures in the range 20-25 bar can be used to maximise feedstock flexibility and any spare pressure head after the pipe reactor stage can be recycled.

Preferably, the pressure drop across the pipe reactor from inflow to outflow end is in the range 0.1 bar-10 bar, more preferably 0.5 bar-58 bar, most preferably in the range 3-7 bar.

Control of Mixing

As noted above, the present invention provides a method and apparatus in which the mixing is controlled so that mass transfer is enhanced without introducing undesired back mixing.

The control of mixing will be described in terms of four parameters:
1. time taken for elements of fluid to pass through the reactor compared to the mean residence time (also called residence time distribution);
2. Maintenance of conditions near plug flow;
3. Reynolds number and energy input;
4. design of mixing elements in the pipe reactor.

1. Time Taken for Elements of Fluid to Pass Through the Reactor

According to one aspect of the present invention, the time taken for 90% of the elements of fluid to pass through the reactor is within 20% of the mean residence time of reactant in the reactor.

Preferably, the time taken for 90% of the elements of fluid to pass through the reactor is within 15%, preferably within 10% of the mean residence time of reactant in the reactor. The skilled person will be aware as part of their common general knowledge how to determine mean residence time and the distribution of time taken for elements of fluid to pass through the reactor. However, the following method of measuring this parameter may be used.

Two electrical conductivity measuring devices are provided. One is provided in a pipe just before the inlet to the pipe reactor. The second is provided in a pipe leading from the outlet of the pipe reactor. To measure the residence time distribution, a stable flow of reactants is established within the pipe reactor.

The pipe reactor is provided with injection means for injecting a test volume into the flow through the pipe reactor.

A test volume comprising reactants which have been well mixed, for example by passing them through a separate pipe section comprising at least one static mixer element, is injected within a period 0.05-2 seconds.

The quantity of the test volume is such that the test volume extends across the entire width of the pipe reactor normal to the bulk flow direction. After a time t=0, the test volume passes the first conductivity probe. After a period t=r, the test volume passes the second conductivity probe. The time r is defined as the residence time.

As the test volume passes the first conductivity probe, the variation of conductivity over time is obtained, to obtain a peak, the shape of which is recorded. As the test volume passes the second conductivity probe, the variation of conductivity over time is measured, to obtain a second peak, the shape of the second peak being recorded. The shape of the first peak is subtracted using a suitable mathematical process from the shape of the second peak. As a result, a peak form is obtained which represents the dispersion of the residence time. The residence time distribution at a certain portion of the peak can then be measured.

The method of mathematical subtraction is generally known as deconvolution and is used mainly to separate overlapping peaks in spectral data. In the present invention, this process may be used to remove the dispersion (width) of one peak from another using a simple Fourier transform (for example, the Fourier system provided by Excel™)

Maintenance of Conditions Near Plug Flow

The present invention preferably uses conditions which approximate to plug flow in the pipe reactor, which may be called 'near plug flow' conditions. This is referred to below as 'plug flow maintenance'.

Preferably, plug flow maintenance is 80% or more.

"Plug flow maintenance' as used herein is defined by the following test.

Plug flow maintenance is measured between two defined points. Preferably the defined points are substantially near the inflow end and near the outflow end of the pipe reactor. They may be located just outside the pipe reactor.

The pipe reactor is provided with electrical conductivity measuring devices at the defined points. The length between the conductivity meters is preferably at least in the range 100 to 110% of the length of the pipe reactor.

To measure plug flow maintenance, a stable flow of reactants is preferably first established within the pipe reactor.

At time defined as t=0, a measured dose of one molar salt (sodium chloride) solution is injected into the flow. The quantity of salt solution injected is preferably such that it is sufficient to define a lamina of relatively narrow thickness (preferably about 1 cm), preferably extending in the direction normal to the flow direction across the whole width of the pipe reactor.

The width of the lamina of salt solution at the first defined point is measured by measuring the conductivity output from the first conductivity meter. The full width at half maximum of the conductivity peak is measured.

The width of the lamina at the second defined point is then measured by measuring the conductivity from the second conductivity meter. The full width at half maximum of the conductivity peak is measured.

Plug flow maintenance is defined as the ratio of the first measurement of the width of the lamina to the second measurement of the width of the lamina.

Preferably, the plug flow maintenance is greater than 80%, most preferably greater than 85% and more preferably greater than 90%.

If the plug flow maintenance is greater than 80%, intermixing of reacted products from one part of the pipe reactor with reactants from an upstream stage (commonly known as back mixing) is kept to a sufficiently low level to allow the transesterification reaction to proceed quickly to a high level of conversion. Preferably, the level of conversion exceeds 95%, more preferably greater than 96.5%. The level of conversion can be measured by determining the quantity of natural oil remaining at the end of the reaction as a percentage of natural oil fed in, Q % and representing conversion as 100−Q %. The inventors have identified that to optimise the use of mixing energy, heat, catalyst, and equipment, the maximum reduction in back mixing is required so that stoichiometric ratios should be maintained as much as is possible.

Reynolds Number and Power Input

Another measure of the mixing applied in the present invention is to specify the Reynolds number and the energy input.

The Reynolds number given by the expression:

$$Re = \rho V d / \mu.$$

Where $\rho$=average density of materials (which can be determined by the person skilled in the art using their common general knowledge).

V=average velocity.

d=Hydraulic diameter. This can be calculated by the person skilled in the art in a manner known from their common general knowledge $\mu$=effective viscosity, which can be calculated by the person skilled in the art in accordance with their common general knowledge, approximating the reactant mixture as a single phase.

Preferably, the Reynolds number in the present invention is in the range 200-10000, more preferably 500-6000.

Mixing power input can be calculated my multiplying the pressure drop across the pipe reactor by the volume flow rate. The degree of mixing can be represented by the power per unit weight of reactants. With the present invention the power per unit weight preferably exceeds 0.5 W/kg, being more preferably in the range 1 W/kg to 10 W/kg, more preferably more than 3 W/kg and preferably less than 8 W/kg.

Mixer Design

It is found that the present invention allows a high level of conversion (in excess of 95%) to be achieved in a time period which is less than five minutes, preferably less than two minutes and with good quality oil, in less than one minute.

It is found that a number of methods and structures may be used to ensure that the reactants pass along the pipe reactor under transitional or turbulent conditions and so that the reactants are mixed in a direction normal to the flow direction such that the time taken for 90% of the elements of fluid to pass through the reactor is within 20% of the mean residence time of reactant in the reactor.

Such constructions and methods may also be applied to achieve the desired maintenance of plug flow and residence time distribution.

For example, the pipe reactor may comprise a plain pipe without any mixing elements. If the flow is maintained at a correct rate such that flow is either turbulent or at the transition between turbulent and laminar flow, and the pipe is of sufficient length, the required plug flow and residence time distribution maintenance may be obtained.

Preferably, however, static mixing elements are present in the pipe reactor. In a preferred embodiment, the static mixing elements are present within selected pipe sections required to perform specific mixing operations needed during the reaction.

Preferably the static mixing elements are of a design which provide a higher level of deviation of the fluid flow path in a direction normal to the flow direction through the pipe reactor than in a direction parallel to the flow direction through the pipe reactor. They mix specifically radially across the pipe.

Suitable design of static mixer element can be obtained from Sultzer or Chemineer, and are chosen for their effect on residence time distribution (dispersion) as a function of length and unit length capital costs.

It is found that some designs of static mixer are less dispersive at high Reynolds number. In order to determine a suitable design of static mixer, variation of residence time distribution (suitably measured by the test described above) against pressure drop is measured. Pressure drop can then be multiplied by flow rate to give the mixing power input. Accordingly, for a given mixing power input, the optimum mixer design can be chosen which gives minimum dispersion.

Static mixer elements may be present for at least part of the length of the pipe reactor. Static mixer elements are preferably present for at least the first 20% of the length, more preferably for at least the first 30% of the length. Preferably, static mixer elements are present for at least the last 30%, more preferably for at least the last 20% of the length of the pipe reactor.

Preferably, there is a portion of the pipe reactor which has no mixer elements. This portion is preferably at least 20% and more preferably at least 30% of the length of the reactor. Preferably, the portion of the pipe reactor which has no mixer elements is displaced from the ends thereof.

Preferably, 30-40% of the mixers, by length, are in the first part of the pipe reactor and 60-70% by length of the static mixers are in the last part of the pipe reactor.

It is found that, in a first stage of the reaction, where there is a very large quantity of unreacted natural oil, a high degree of mixing is beneficial for obtaining a high rate of reaction. In a middle section of the process, a substantial portion of the natural oil has been converted to mono- or diglycerides. These are found to have surfactant properties. This can enhance the mixing of the reactants in the middle part of reaction. In a final part of the reaction, a substantial proportion of the natural oil has been converted to methyl esters and it is found that further mixing is beneficial.

Preferably, over 95%; more preferably over 96.5% by weight of natural oil is converted in a single pass through the pipe reactor. Preferably, there is no further transesterification reactor. Preferably, the residence time of the reactant in the pipe reactor is less than five minutes, more preferably less than 2.5 minutes, most preferably less than two minutes, and in some cases, several tens of seconds.

The pipe reactor may comprise a section comprising mixer elements which is located upstream of a point at which short chain alcohol, alkaline catalyst or a mixture thereof, is injected into the flow. This ensures that the flow is already turbulent at the point at which the reactants are mixed, obtaining a high level of intermixing and reaction.

Biodiesel Production Process

The method and apparatus of the present invention preferably form part of a process for producing biodesiel from a fuel crop. Such a process typically comprises the following steps:

a) The fuel crop, typically in the form of seed or nuts, (but also can be animal derived tallow) is received. Optionally, they are treated by washing, cleaning, grading, removal of foreign objects etc.

b) Seeds or nuts are crushed. This may be carried out in one or more steps in apparatus known to the person skilled in the art. The natural oil is obtained from the crushed seeds or nuts, for example by pressing.

c) Hexane treatment. The person skilled in the art will be aware of suitable techniques for hexane treatment. Suitably, hexane is recycled.

d) Degumming. This is process whereby phospholipids typically obtained from the shell material of the seeds or nuts are removed. Typically, the oil is heated to a reaction temperature which is suitably in the range 80-150° C., more preferably around 90-120° C. It is then reacted with phosphoric acid which polymerises phospholipids to form solids which are then separated by gravity. Treated oil is removed from the top of the separation tank. Separated polymerised phospholipids are removed from the bottom of the tank and disposed of. They may be burnt. Heat released by burning may be used to heat the process.

f) Esterification of free fatty acid. Natural oil typically contains a certain quantity of non-esterified free fatty acid. If this is present during the biodiesel synthesis step, it tends to form soap with alkali catalyst which introduces an impurity and affects the reaction in the biodiesel synthesis. Free fatty acid is typically converted by esterifying with short chain alcohol to produce biodiesel. The esterification may be carried out with a C1-C4 alcohol, branched or straight, most preferably methanol or ethanol. This process is typically carried out at a temperature in the range 100-153° C., suitably about 120-140° C.

Typically, the short chain fatty acid will be added in substantial excess in order to drive this reaction to completion. Excess short chain alcohol may be removed by evaporation. Condensed short chain alcohol may be returned to an earlier stage in the process.

g) biodiesel synthesis by transesterification, according to the invention h) separation. Separation may be achieved by any conventional means, for example, by gravity separation, by centrifuging or by cyclone, with or without coalescing systems or internal devices such as weirs, or external devices such as boots (extra lower chambers designed to concentrate heavy phase material prior to removal).

Any or all of the downstream separation devices may be pressurised and operate at the same downstream pressure at the end of the pipe reactor. This will allow separation to occur before the remaining reactor pressure is dropped to downstream operation levels, via pressure drop valves, into light and heavy phases. The benefit of such an arrangement is that the excess energy remaining within the reactor (as pressure) is not dissipated across a multiphase pressure drop valve. Accordingly, the mixing of the biodiesel, methanol and glycerine mixture by the pressure drop process is avoided. This allows separation to occur more quickly and efficiently with lower capital expensive equipment.

Glycerine separated from the biodiesel may be disposed of by any suitable means, for example it may be burnt to provide heat for the processes described above.

Preferably, the apparatus of the present invention comprises part of a plant which comprises at least one of the apparatus for degumming the natural oil and apparatus for esterifying free fatty acid, preferably both.

There is preferably a heater for heating natural oil which is fed to degumming apparatus or the apparatus for esterifying free fatty acid.

Where both a degumming apparatus and apparatus for esterifying free fatty acid are present, the natural oil is preferably passed through the degumming apparatus first.

Preferably, there is a feed means, for example, a pipe, from the degumming apparatus to the biodiesel synthesis apparatus of the present invention or from the degumming apparatus to the apparatus for esterifying free fatty acid or from the apparatus for esterifying free fatty acid to the biodiesel synthesis apparatus of the present invention. Preferably, there is no intermediate cooling step in which the temperature is dropped to close to ambient temperature. In this way, heat energy delivered to the natural oil at the beginning of the process can be retained, reducing the heat energy required to be put into the apparatus.

It should be noted that, where free fatty acid is removed after the step of esterifying free fatty acid, the natural oil may be cooled due to the removal of the latent heat of vaporisation of the short chain alcohol. However, this is not designed as a cooling step. Further, the temperature of the natural oil is typically not reduced by this step to ambient temperature.

Where short chain alcohol is removed by vapourisation, the short chain alcohol can be separately condensed and the latent heat of vaporisation used to heat the natural oil. Preferably, it is used to heat the natural oil from ambient temperature. It is found that the heat transfer is most efficient when the temperature difference between the hot fluid and the cold fluid is at its greatest.

A further heating may be required for heating natural oil which has been cooled by removal of free short chain alcohol, to the temperature required in the biodiesel synthesis apparatus.

A heat exchanger may be provided for transferring heat from biodiesel which has been prepared in the biodiesel synthesis apparatus to the natural oil which is fed into it.

Short chain alcohol which is condensed may be reused in the step of esterifying free fatty acid.

Biodiesel Production on a Ship

In the second aspect, the present invention provides a ship, comprising means for storing a raw material used in the synthesis of biodiesel, a plant for processing for the raw material, to create biodiesel and means for storing the biodiesel formed and a system for offloading the vegetable oil from onshore without a conventional pier, jetty or dock.

In the second aspect of the invention, a biodiesel production plant is mounted on ship. An economic benefit of using a travelling ship based processing system is that the excess heat generated through the natural inefficiencies of all combustion engines, whether they be petrol, diesel internal combustion or gas turbine, can be captured and used to heat the oil and fats throughout the entire biodiesel process. The kinetic energy required within the process relating to the pumping of the fluids is small being around 5 to 10% of the entire biodiesel processing cost. This energy could be obtained as a by product of the ship's steam supply (to then convert to electricity), or taken off ship's electricity supply. The choice of where the pumping energy comes from will be based on the specifics of the ship's system and the economics.

The biodiesel production plant will preferably be made suitable for use at sea (or 'marinized') for example to provide resistance to corrosion from sea water and resistance to the rolling motion of a ship at sea.

The marinized process plant can be made modular for ease of maintenance, speed of assembly through concurrent production and, if required, transferred easily to other ships' hulls once the ship's life is over, after maybe twenty years service.

The main modifications required to the ship will be as follows;
(i) Hold configuration preferably comprises a separate hold for methanol, so as to store the initial charge of basic methanol required to process the biodiesel. As the methanol will be recovered and reused throughout the process only 10% by volume of methanol as a portion of the oil processed will be required. However as with all industrial systems inefficiencies will be encountered so somewhere between 10 and 15% by volume methanol should be stored prior to use.
(ii) Hold configuration preferably comprises a plurality of compartments for oil. Preferably, as each compartment of oil is processed into biodiesel in turn, to minimise any reprocessing of already processed material.
(iii) Preferably, heat exchangers that can be switched from conventional sea water/oil to vegetable oil/engine oil are provided, as the ship's engines should be conventionally cooled during the outward journey and cooled to some degree with the vegetable oil during any processing.
(iv) Gas turbines can burn vegetable oils especially when low in free fatty acid and could be configured to burn (if hot enough) the glycerine by product, for example as a part blend with vegetable oil, biodiesel or conventional marine diesel.
(v) Preferably, the deck is reinforced to hold and retain the process modules.

The ship of the second aspect of the invention may not be capable of propelling itself, comprising, for example, a barge, that can be moored indefinitely. The advantages with barges are size, cost and longevity of life due to construction as some are made of concrete and other inert marine materials.

The third aspect of the present invention is suitable for use with the second aspect of the invention.

There may further be processing plant for extracting oil or fat from primary sources such as seeds, and optionally for treating the oil. The plant may comprise biodiesel synthesis plant, for example, according to the first aspect of the invention. There may be a plurality of storage containers, such as tanks, tank farms or the like. There may be a plurality of floating loading points.

The system may correspond to systems used for the loading of mineral oil onto ships.

The CALM buoy may be as used in systems for the loading of mineral oil and may be as described in EP1506920 or GB2250253.

BRIEF DESCRIPTION OF DRAWINGS

The present invention will be further described by way of example only with reference to the accompanying drawings, in which.

DETAILED DESCRIPTION

Figure 1:
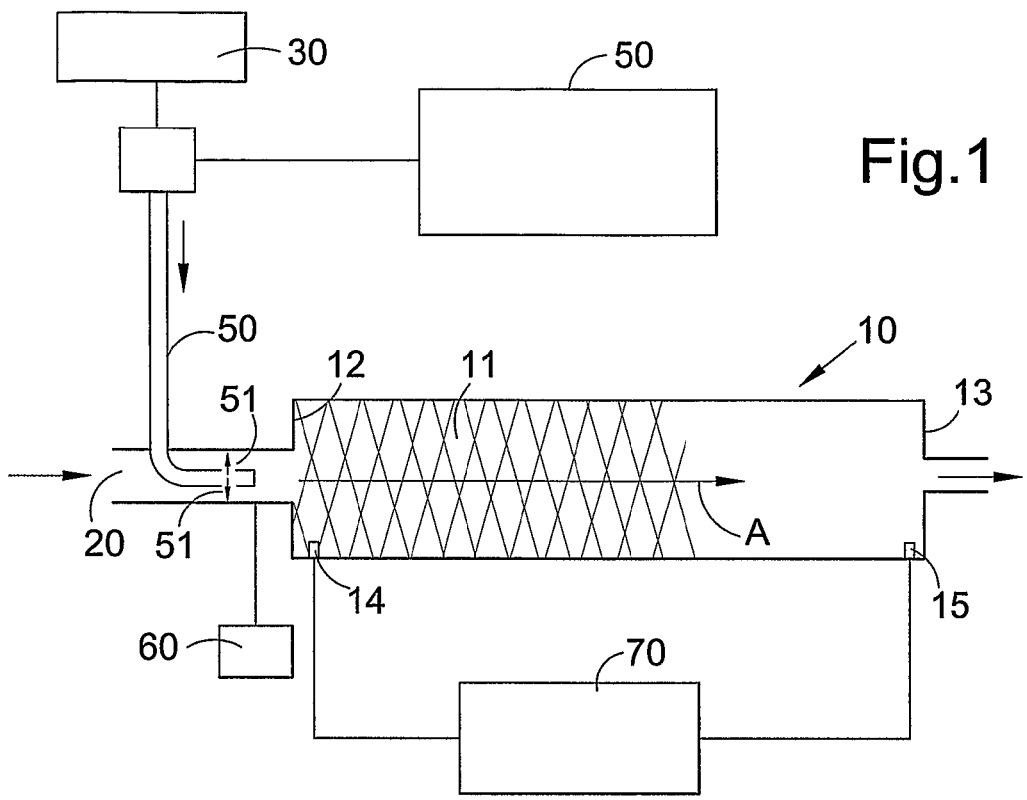
FIG. 1 is a schematic illustration of an apparatus for carrying out the process of the present invention.

The apparatus of FIG. 1 comprises a pipe reactor 10.

A natural oil is fed through pipe 20 from a source (not shown) having been optionally heated.

The oil may be heated to any suitable temperature, for example being in excess of 40° C., more preferably in excess of 40° C. and most preferably in the range 45-130° C.

Alkaline catalyst is fed from a tank 30 and mixed in a mixer 40 with short chain alcohol from a tank 50.

In an alternative embodiment, the short chain alcohol and the alkaline catalyst may be supplied ready mixed. The mixer 40 also comprises a pump for feeding the mixture of short chain alcohol and alkaline catalyst under pressure through a tube 50 into the tube 20. The tube 50 terminates in jet nozzles 51 directed generally normal to the direction of flow through the pipe 20. This generates turbulence in the pipe 20. The turbulent mixture of natural oil, short chain alcohol and alkaline catalyst is fed into the pipe reactor 10.

At least in the first part, the pipe reactor 10 comprises mixing elements 11 which are of a configuration such that they cause mixing in a direction normal to the direction of flow (indicated by arrow A) through the pipe reactor 10 in preference to mixing in a direction parallel to the flow direction A.

The pipe reactor 10 has an input end 12 and an output end 13. At or very close to the input and output end 12 and 13, conductivity measurers 14 and 15 respectively are provided.

A dosing means 60 is provided for measuring the plug flow and residence time distribution maintenance in the pipe reactor 10 between the input and output ends 12 and 13.

At the output end 13, reaction products comprising biodiesel, glycerol and small quantities of un-reacted components are fed to further treatment (not shown).

A controller 70 is provided for controlling and monitoring the output of the conductivity metres 14 and 15.

The dosing device 60 can be used to inject into the flow in pipe 20 a quantity of one molar sodium chloride in such a quantity to form a lamina at least one centimetre wide in the direction normal to the flow direction A.

The conductivity devices 14 and 15 can then be used in conjunction with the controller 70 to measure the plug flow and residence time distribution maintenance across the length of the reactor by the method described above.

Figure 2:
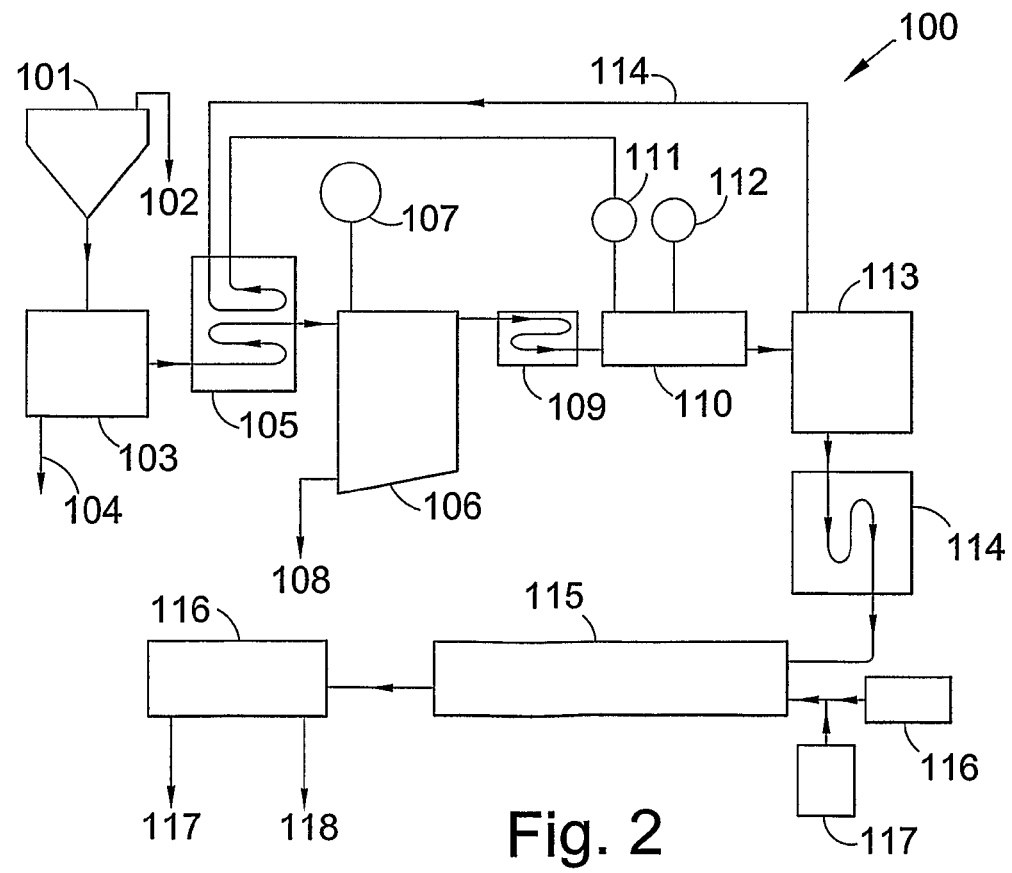
FIG. 2 is a schematic plan of a plant for synthesis of biodiesel from a raw material.

FIG. 2 is a schematic view of a complete plant for biodiesel synthesis from materials such as nuts or seeds. The nuts or seeds are initially crushed and pressed in a crusher 101. Suitable designs of crusher or press are the known to the person skilled in the art. The crushed and pressed seed material is rejected at 102 and may be disposed of, for example by burning to generate heat or as feedstock for animals. Hexane extraction may be used to further enhance oil collection from the seeds. Partially treated raw natural oil is fed to heat exchanger 105. The heat exchanger 105 raises the temperature of the partially treated raw natural oil to about 100° C. and it is then fed into a degumming plant.

Suitable designs of hexane extractor will be known to the person skilled in the art. Suitable designs of degumming plant are known to the person skilled in the art. In the degumming plant 106, phosphoric acid, stored in a tank 107 is dosed into the heated partially treated raw natural oil to polymerise phospholipids which are precipated and collected at 108 for disposal. Secondary treated natural oil is then collected at the top of the vessel and fed to a second heat exchanger 109 where the temperature is raised to 130° C. The heated secondary treated raw natural oil is fed to a reaction vessel 110. Also fed to the reaction vessel is a short chain alcohol, for example methanol, stored in a vessel 111 and a mineral acid catalyst, stored in the vessel 112. The mineral acid catalyses the esterification of free fatty acid in the secondary raw natural oil to generate methyl esters of the fatty acids (i.e. biodiesel) so that any free fatty acid is removed.

The final treated raw natural oil obtained is then fed into a separator 113. An excess of short chain alcohol is used in the reactor 110 to drive the esterification reaction to a high degree of completion. The short chain alcohol is removed in the separator 113 as a vapour.

The vapour is transferred by a line 114 and condensed, the heat being used in the heat exchanger 105 as shown schematically in FIG. 2. Other arrangements for transferring the heat of condensation of the methanol may be used. However, it is beneficial that the heat exchange to remove heat from the vapourised methanol is achieved by contacting it with the raw natural oil which is at ambient temperature. Because these have a very great temperature difference, the heat exchange is rapid and efficient.

The natural oil will be typically cooled by the vapourisation of the methanol to about 50-60° C. and needs to be heated again in a third heat exchanger 114, where it is heated to a temperature of 130° C. The heated oil is then fed into a pipe reactor 115 which is as shown in FIG. 1. Also shown schematically are the supply of alkaline catalyst 116 and short chain alcohol 117 of FIG. 1. Further details of the pipe reactor are as shown in FIG. 1 and are not described here.

A mixture of biodiesel and glycerine is obtained in the pipe reactor 115 which is then fed to a separator 116 where glycerine and used alkaline catalyst are separated and rejected at 117 for disposal, burning or reuse as appropriate. Finally, a high quality biodiesel is obtained at 118.

Figure 3:
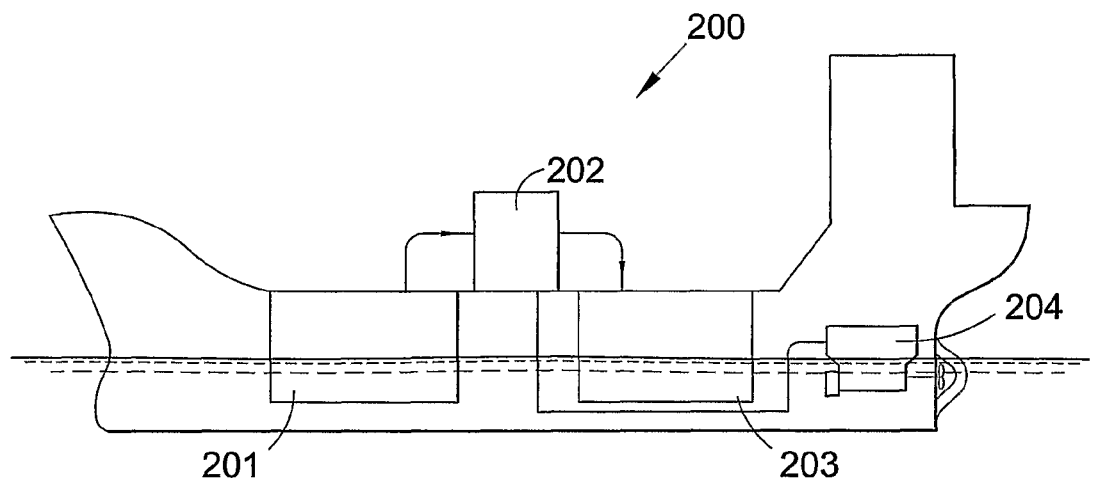
FIG. 3 is a schematic view of ship according to the second aspect of the invention.

FIG. 3 shows a schematic view of a ship according to the second aspect of the invention. The ship 200 may be a coaster or tanker of conventional size and design.

However, it is provided with a first store 201 for a raw material. The raw material may comprise unprocessed nuts or seeds or some form of natural oil which has been wholly or partially treated as shown in FIG. 2 at any stage up to the separator 113.

Feeding means (for example a pump or conveyor—not shown) are provided for feeding the raw material to a plant 202 for the synthesis of biodiesel. The plant may correspond to the pipe reactor of FIG. 1 or the plant shown in FIG. 2 or any combination of pipe reactor of FIG. 1 and oil processing steps such as are known in the art. The plant 202 is shown mounted in a deck house, but may be mounted in a separate hold. Biodiesel generated in the plant 202 is delivered to a second tank 203 where it is stored.

According to preferred aspect of the second aspect of the invention, heat required for the process carried out in the plant 202 can be obtained as waste heat from the engine 204 of the ship.

Figure 4:
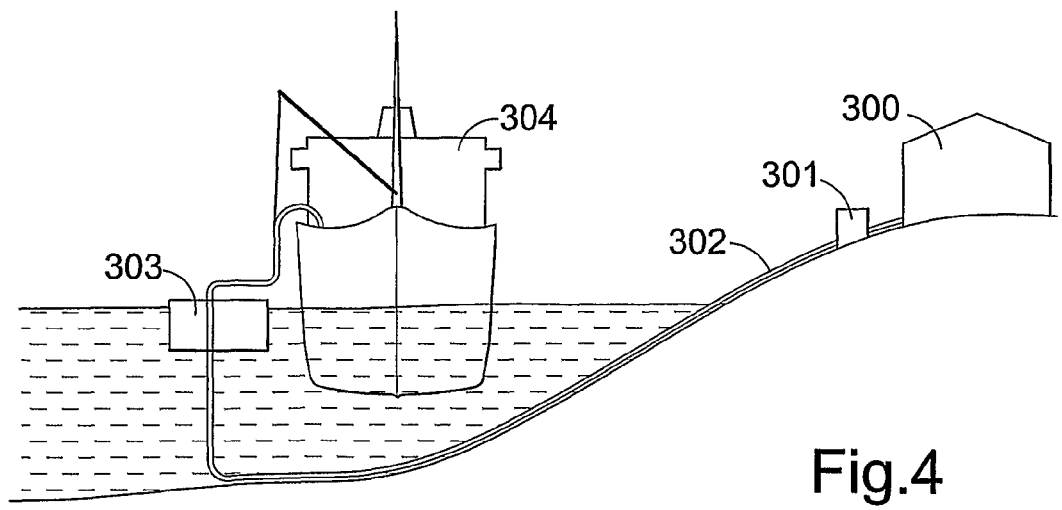
FIG. 4 is a schematic view of a CALM buoy system according to the third aspect of the invention.

FIG. 4 shows a schematic view of a system for loading biodiesel or oils and fats suitable for synthesis of biodiesel from land to ships.

A storage facility 300 is provided, containing biodiesel or natural fats and oils suitable for the synthesis of biodiesel, produced in the area near the system. The facility 300 may include a plant for the treatment of the oil, and optionally for synthesis of biodiesel.

A pump 301 is provided for pumping oil or biodiesel from the facility 300 through a pipeline 302, that extends underwater along the seabed to a CALM buoy 303. The CALM buoy is anchored in water deep enough allow a ship 304 to lies alongside the buoy or tie up to it, to allow oil or biodiesel to be pumped into the ships holds.

EXAMPLE

A flow of sunflower oil heated to 80° C. is fed to a 6 mm diameter pipe reactor at a rate of 30 litres/hour under a pressure of 4-bar gauge.

The pipe reactor is insulated but not separately heated. It is of length 15 m. Kenics™ KMX mixer elements are placed in the reactor and fill 60% of the pipe length.

A supply of KOH and methanol at ambient temperature is prepared and fed under pressure into the flow of oil through nozzles extending at right angles to the flow direction of the oil to generate turbulence.

The ratio by mass of the flow rate of sunflower oil to methanol is 4:1.

The KOH is initially mixed with the methanol at a weight ratio of 24.5 g solid KOH to 1 litre dry methanol.

Retention time of the reaction mixture is 90 seconds.

Plug flow maintenance as measured by the method described above exceeds 90%.

The time taken for 90% of the elements of fluid to pass through the reactor is within 20% of the mean residence of time reactant in the reactor, determined by the process described above.

Over 96.5% conversion to methyl ester (biodiesel) is obtained.

The invention claimed is:

1. A method of reacting a natural oil with a short chain alcohol in the presence of alkaline catalyst, the method comprising feeding reactants comprising a mixture of natural oil, short chain alcohol and alkaline catalyst in one direction along a pipe reactor under transitional or turbulent conditions, wherein the pipe reactor has a diameter in the range of 2-200 mm and a length in the range of 30 to 100 meters, the pipe reactor including static mixing elements that are present for at least a first 20% of the length of the pipe reactor and for at least a last 30% of the length of the pipe reactor, and wherein a portion of the pipe reactor that comprises at least 20% of the length of the pipe reactor and is displaced from the ends thereof has no mixer elements, so that the reactants are mixed in a direction normal to the flow direction to a greater degree than in a direction parallel to the flow direction.

2. The method of claim 1, wherein the mixture of natural oil, short chain alcohol and alkaline catalyst is turbulent when it enters the pipe reactor.

3. The method of claim 2, wherein turbulence is generated by injecting a flow of short chain alcohol, into a flow of natural oil.

4. The method of claim 1, wherein the reactants are under a pressure in excess of 0.5 bar gauge.

5. The method of claim 1, wherein a pressure drop across the pipe reactor from inflow to outflow end is in the range 0.1 bar-10 bar.

6. The method of claim 1, wherein a Reynolds number in the pipe reactor is in the range 200-10000.

7. The method of claim 1, wherein a power per unit weight exceeds 0.5 W/kg.

8. An apparatus for reacting a natural oil with a short chain alcohol in the presence of alkaline catalyst, comprising a pipe reactor that has a diameter in the range of 2 to 200 mm and a length in the range of 30 to 100 meters, a feed of natural oil, a feed of short chain alcohol and a feed of alkaline catalyst, the feed being arranged to feed reactants in one direction along the pipe reactor, static mixing elements being provided in the pipe reactor so that the reactants are fed in transitional or turbulent conditions, wherein static mixing elements are present for at least a first 20% of the length of the pipe reactor and for at least a last 30% of the length of the pipe reactor, and there is a portion of the pipe reactor that comprises at least 20% of the length of the pipe reactor and is displaced from the ends thereof which has no mixer elements, so that reactants are mixed in a direction normal to the flow direction to a greater degree than in a direction parallel to the flow direction.

9. The apparatus of claim 8, wherein the mixture of natural oil, short chain alcohol and alkaline catalyst is turbulent when it enters the pipe reactor.

10. The apparatus of claim 9, comprising injection means for injecting a flow of short chain alcohol, said injection means including jet nozzles constructed and arranged to inject the flow of short chain alcohol at an angle to the direction of flow of the natural oil, such that the mixture of natural oil, short chain alcohol and alkaline catalyst is turbulent when it enters the pipe reactor.

11. The apparatus of claim 8, comprising pressurizing means for placing the reactants under a pressure in excess of 0.5 bar gauge.

12. The apparatus of claim 8, wherein a pressure drop across the pipe reactor from inflow to outflow end is in the range 0.1 bar-10 bar.

13. The apparatus of claim 8, wherein a Reynolds number in the pipe reactor is in the range 200-10000.

14. The apparatus of claim 8, wherein a power per unit weight exceeds 0.5 W/kg.

15. The apparatus of claim 8, provided as part of a plant for synthesizing biodiesel, wherein said plant is provided on a ship, said ship further comprising: (i) means for storing a raw material used in the synthesis of biodiesel; and, (ii) means for storing biodiesel synthesized by said plant.

16. The apparatus of claim 8, located in a plant for the manufacture of biodiesel, further comprising at least one of an apparatus for degumming natural oil and an apparatus for esterifying free fatty acid in natural oil.

17. A method of reacting a natural oil with a short chain alcohol in the presence of alkaline catalyst, in which a mixture of reactants comprising natural oil, short chain alcohol and alkaline catalyst is fed in one direction along a pipe reactor under transitional or turbulent conditions, the pipe reactor having a diameter in the range of 2-200 mm and a length in the range of 30 to 100 meters, and including static mixing elements that are present for at least a first 20% of the length of the pipe reactor and for at least a last 30% of the length of the pipe reactor, and wherein a portion of the pipe reactor that comprises at least 20% of the length of the pipe reactor and is displaced from the ends thereof has no mixer elements, so that the reactants are mixed in a direction normal to the flow direction such that the time taken for 90% of the elements of fluid to pass through the reactor is within 20% of the mean residence time of reactant in the reactor.

18. The method of claim 2, wherein turbulence is generated by injecting a flow of short chain alcohol with alkaline catalyst dissolved therein into the flow of natural oil.

19. The method of claim 2, wherein turbulence is generated by injecting a flow of short chain alcohol into the flow of natural oil at an angle to the direction of flow of the natural oil.

20. The method of claim 1, wherein the reactants are under a pressure in the range 1-30 bar gauge.

21. The method of claim 1, wherein a pressure drop across the pipe reactor from inflow to outflow end is in the range 0.5 bar-8 bar.

22. The method of claim 1, wherein a pressure drop across the pipe reactor from inflow to outflow end is in the range 3-7 bar.

23. The method of claim 1, wherein a Reynolds number in the pipe reactor is in the range 500-6000.

24. The method of claim 1, wherein a power per unit weight is in the range 1 W/kg to 10 W/kg.

25. The method of claim 1, wherein a power per unit weight is in the range 3 W/kg to 8 W/kg.

26. The method of claim 1, wherein the pipe reactor has a diameter in the range 6 mm-200 mm.

27. The method of claim 1, wherein the length of the pipe reactor is in the range 40 to 100 meters.

28. The method of claim 1, wherein static mixer elements are present for at least the first 30% of the length of the pipe reactor.

29. The method of claim 1, wherein the portion of the pipe reactor which has no mixer elements is at least 30% of the length of the pipe reactor.

30. An apparatus for reacting a natural oil with a short chain alcohol in the presence of alkaline catalyst, comprising a pipe reactor that has a diameter in the range of 2-200 mm and a length in the range of 30 to 100 meters, a feed of natural oil, a feed of short chain alcohol and a feed of alkaline catalyst, the feed being arranged to feed reactants in one direction along the pipe reactor, static mixing elements being provided in the pipe reactor so that the reactants are fed in transitional or turbulent conditions, wherein static mixing elements are present for at least a first 20% of the length of the pipe reactor and for at least a last 30% of the length of the pipe reactor, and there is a portion of the pipe reactor that comprises at least 20% of the length of the pipe reactor and is displaced from the ends thereof which has no mixer elements, so that the reactants are mixed in a direction normal to the flow direction such the time taken for 90% of the elements of fluid to pass through the reactor is within 20% of the mean residence time of reactant in the reactor.

31. The apparatus of claim 9, comprising injection means for injecting a flow of short chain alcohol with alkaline catalyst dissolved therein, into the flow of natural oil, said injection means including jet nozzles constructed and arranged to inject the flow of short chain alcohol at an angle to the direction of flow of the natural oil, such that the mixture of natural oil, short chain alcohol and alkaline catalyst is turbulent when it enters the pipe reactor.

32. The apparatus of claim 8, comprising pressurizing means for placing the reactants under a pressure in the range 1-30 bar gauge.

33. The apparatus of claim 8, wherein a pressure drop across the pipe reactor from inflow to outflow end is in the range 0.5 bar-8 bar.

34. The apparatus of claim 8, wherein a pressure drop across the pipe reactor from inflow to outflow end is in the range 3-7 bar.

35. The apparatus of claim 8, wherein a Reynolds number in the pipe reactor is in the range 500-6000.

36. The apparatus of claim 8, wherein a power per unit weight is in the range 1 W/kg to 10 W/kg.

37. The apparatus of claim 8, wherein a power per unit weight is in the range 3 W/kg to 8 W/kg.

38. The apparatus of claim 8, wherein the pipe reactor has a diameter in the range 6 mm-200 mm.

39. The apparatus of claim 8, wherein the length of the pipe reactor is in the range 40 to 100 meters.

40. The apparatus of claim 8, wherein static mixer elements are present for at least the first 30% of the length of the pipe reactor.

41. The apparatus of claim 8, wherein the portion of the pipe reactor which has no mixer elements is at least 30% of the length of the pipe reactor.

* * * * *